US012628121B2

(12) United States Patent
Ali et al.

(10) Patent No.: US 12,628,121 B2
(45) Date of Patent: May 12, 2026

(54) OBTAINING MACHINE LEARNING (ML) MODELS FOR SECONDARY METHOD OF ORIENTATION DETECTION IN USER EQUIPMENT (UE)

(71) Applicant: Nokia Technologies Oy, Espoo (FI)

(72) Inventors: Samad Ali, Oulu (FI); Sofonias Hailu, Oulu (FI); Satya Krishna Joshi, Oulu (FI); Rauli Jarkko Kullervo Järvelä, Oulu (FI)

(73) Assignee: Nokia Technologies Oy, Espoo (FI)

( * ) Notice: Subject to any disclaimer, the term of this patent is extended or adjusted under 35 U.S.C. 154(b) by 313 days.

(21) Appl. No.: 18/549,414

(22) PCT Filed: Mar. 9, 2021

(86) PCT No.: PCT/US2021/070255
§ 371 (c)(1),
(2) Date: Sep. 7, 2023

(87) PCT Pub. No.: WO2022/191901
PCT Pub. Date: Sep. 15, 2022

(65) Prior Publication Data
US 2024/0155553 A1      May 9, 2024

(51) Int. Cl.
*H04W 64/00*          (2009.01)
*H04B 7/06*           (2006.01)
(Continued)

(52) U.S. Cl.
CPC ...... *H04W 64/006* (2013.01); *H04B 7/06956* (2023.05); *H04B 17/328* (2023.05); *H04B 17/3913* (2015.01)

(58) Field of Classification Search
CPC ............. H04W 64/006; H04B 7/06956; H04B 17/328; H04B 17/3913; G06N 20/00; G01S 5/0247
See application file for complete search history.

(56) References Cited

U.S. PATENT DOCUMENTS

| | | | |
|---|---|---|---|
| 10,671,921 B1 | 6/2020 | Karon et al. | |
| 2003/0220116 A1* | 11/2003 | Sagefalk ............... | H04W 64/00 |
| | | | 455/456.1 |

(Continued)

FOREIGN PATENT DOCUMENTS

| | | |
|---|---|---|
| DE | 102008053176 A1 | 4/2010 |
| JP | 2012506541 A | 3/2012 |

(Continued)

OTHER PUBLICATIONS

"3rd Generation Partnership Project; Technical Specification Group Services and System Aspects; Service requirements for the 5G system; Stage 1 (Release 18)", 3GPP TS 22.261, V18.0.0, Sep. 2020, 84 pages.

(Continued)

*Primary Examiner* — Kenneth T Lam
(74) *Attorney, Agent, or Firm* — Lippes Mathias LLP

(57)          ABSTRACT
Various techniques are provided for receiving, by a base station (BS) from a user equipment (UE), a communication including a feature vector, storing, by the BS, a dataset including one or more feature vectors associated with the UE, communicating, by the BS to a network device, the dataset associated with the UE, receiving, by the BS from the network device, a machine learning (ML) model, the ML model being trained, using the dataset, to detect UE orientation, and communicating, by the BS to the UE, the trained ML model.

17 Claims, 11 Drawing Sheets

(51) Int. Cl.
   *H04B 17/318*          (2015.01)
   *H04B 17/391*          (2015.01)

(56)                    References Cited

U.S. PATENT DOCUMENTS

| | | | |
|---|---|---|---|
| 2011/0316748 A1* | 12/2011 | Meyer | G01S 5/02524 |
| | | | 342/450 |
| 2013/0156080 A1 | 6/2013 | Cheng et al. | |
| 2014/0120958 A1 | 5/2014 | Nitta et al. | |
| 2018/0188736 A1 | 7/2018 | Jian et al. | |
| 2020/0151611 A1* | 5/2020 | McGavran | G01C 21/367 |
| 2022/0038349 A1* | 2/2022 | Li | G06N 3/045 |
| 2023/0214463 A1* | 7/2023 | Waterman | H04M 1/72463 |
| | | | 726/7 |

FOREIGN PATENT DOCUMENTS

| | | |
|---|---|---|
| JP | 2019008424 A | 1/2019 |
| WO | 2020/068331 A1 | 4/2020 |
| WO | 2020/217460 A1 | 10/2020 |
| WO | 2022/022805 A1 | 2/2022 |

OTHER PUBLICATIONS

"3rd Generation Partnership Project; Technical Specification Group Services and System Aspects; Service requirements for cyber-physical control applications in vertical domains; Stage 1 (Release 17)", 3GPP TS 22.104, V17.4.0, Sep. 2020, pp. 1-76.

"Feature lead summary#3 of Enhancements on Multi-beam Operations", 3GPP TSG RAN WG1 Meeting #97, R1-1907860, Agenda: 7.2.8.3, LG Electronics, May 13-17, 2019, pp. 1-35.

Schall et al., "North-centred orientation tracking on mobile phones", IEEE International Symposium on Mixed and Augmented Reality, Oct. 13-16, 2010, pp. 267-268.

Azuma et al., "A motion-stabilized outdoor augmented reality system", Proceedings IEEE Virtual Reality (Cat. No. 99CB36316), Mar. 13-17, 1999, 8 pages.

Schall et al., "Global pose estimation using multi-sensor fusion for outdoor Augmented Reality", 8th IEEE International Symposium on Mixed and Augmented Reality, Oct. 19-22, 2009, pp. 153-162.

Talvitie et al., "High-Accuracy Joint Position and Orientation Estimation in Sparse 5G mmWave Channel", IEEE International Conference on Communications (ICC), May 20-24, 2019, 7 pages.

Mendrzik et al., "Harnessing NLOS Components for Position and Orientation Estimation in 5G Millimeter Wave MIMO", IEEE Transactions on Wireless Communications, vol. 18, No. 1, Jan. 2019, pp. 93-107.

"3rd Generation Partnership Project; Technical Specification Group Radio Access Network; NR; Physical layer procedures for data (Release 16)", 3GPP TS 38.214, V16.4.0, Dec. 2020, pp. 1-169.

International Search Report and Written Opinion received for corresponding Patent Cooperation Treaty Application No. PCT/US2021/070255, dated Nov. 23, 2021, 15 pages.

Office action received for corresponding Japanese Patent Application No. 2023-555243, dated Nov. 5, 2024, 2 pages of office action and 2 pages of translation available.

* cited by examiner

Example Wireless Network 130

Receive feature vectors — S405

Store the feature vectors as a dataset — S410

Communicate the dataset — S415

Receive a request for a trained ML model — S420

Request the trained ML model — S425

Receive the trained ML model — S430

Communicate the trained ML model — S435

Measure features     S505

Generate a feature vector     S510

Communicate the feature vector     S515

Request a ML model     S520

Receive the ML model     S525

Determine a UE orientation using the ML model     S530

Receive a dataset of feature vectors   S605

Select a ML model   S610

Train the ML model using the dataset   S615

Receive a request for the trained ML model   S620

Communicate the trained ML model   S625

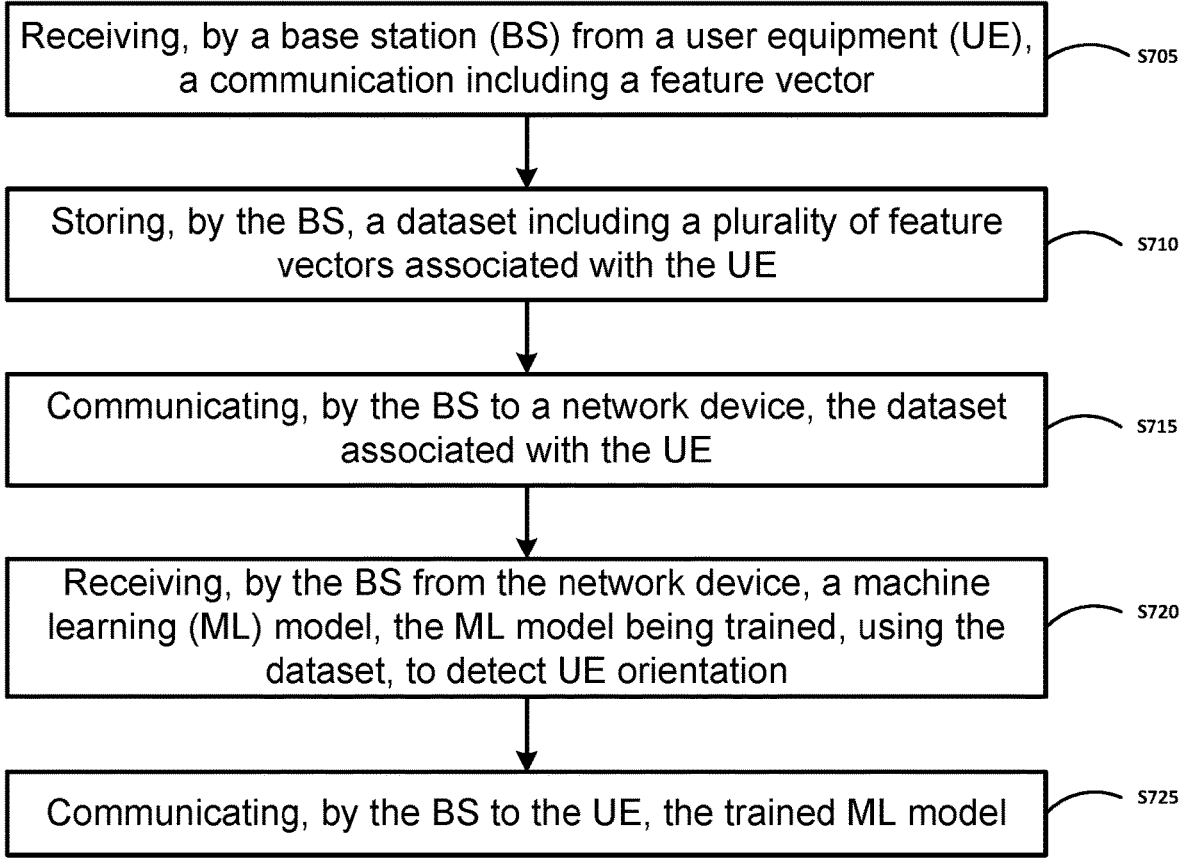

Receiving, by a base station (BS) from a user equipment (UE), a communication including a feature vector — S705

Storing, by the BS, a dataset including a plurality of feature vectors associated with the UE — S710

Communicating, by the BS to a network device, the dataset associated with the UE — S715

Receiving, by the BS from the network device, a machine learning (ML) model, the ML model being trained, using the dataset, to detect UE orientation — S720

Communicating, by the BS to the UE, the trained ML model — S725

FIG. 7

Generating, by a user equipment (UE), a feature vector based on UE measurements ⟋ S805

Communicating, by the UE to a base station (BS), a message including the feature vector ⟋ S810

Receiving, by the UE from the BS, a machine learning (ML) model, the ML model being trained, using the feature vector, to detect UE orientation ⟋ S815

OBTAINING MACHINE LEARNING (ML) MODELS FOR SECONDARY METHOD OF ORIENTATION DETECTION IN USER EQUIPMENT (UE)

RELATED APPLICATION

This application was originally filed as PCT Application No. PCT/US2021/070255 on Mar. 9, 2021, which is incorporated herein by reference in its entirety.

TECHNICAL FIELD

This description relates to wireless communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments. Aspects of LTE are also continuing to improve.

5G New Radio (NR) development is part of a continued mobile broadband evolution process to meet the requirements of 5G, similar to earlier evolution of 3G and 4G wireless networks. 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT) and may offer new types of mission-critical services. For example, ultra-reliable and low-latency communications (URLLC) devices may require high reliability and very low latency.

SUMMARY

According to an example embodiment, a method may include receiving, by a base station (BS) from a user equipment (UE), a communication including a feature vector, storing, by the BS, a dataset including one or more feature vectors associated with the UE, communicating, by the BS to a network device, the dataset associated with the UE, receiving, by the BS from the network device, a machine learning (ML) model, the ML model being trained, using the dataset, to detect UE orientation, and communicating, by the BS to the UE, the trained ML model.

Implementations can include one or more of the following features. For example, the dataset can include UE information associated with orientation. The feature vector can include information associated with at least one of Reference Signal Received Power (RSRP) measurements, Signal to Interference and Noise Ratio (SINR) measurements, serving mobile terminal (MT) panel, serving receiver (Rx)

beam, serving transmitter (Tx) beam(s), and UE orientation. The feature vector can include at least one of RSRPs of strongest beams to the BS, selected UE panel, Rx beam, and UE orientation per each reported RSRP. The ML model maps a set of RSRP, selected UE panel and selected Rx beam, and serving Tx beam(s) to the UE orientation.

The method can further include receiving, by the BS from the UE, a communication indicating a sensor failure at the UE, and receiving, by the BS from the UE, a communication including a request for the trained ML model, wherein the receiving of the trained ML model by the BS from the network device is in response to a request for the ML model based on the communication of the request for the trained model from the UE. The communication including the request for the trained ML model received from the UE can include UE device type information and UE sensor type information. The request for the trained ML model communicated to the network device can include UE device type information and UE sensor type information. The method can further include selecting, by the BS, the ML model, and evaluating, by the BS, an accuracy of the trained ML model based a test dataset, wherein the communicating of the trained ML model by the BS is in response to determining the trained ML model meets an accuracy criterion. The method can further include receiving, by the BS from the UE, a communication including UE orientation determined using the ML model.

According to another example embodiment, a method may include generating, by a user equipment (UE), a feature vector based on UE measurements, communicating, by the UE to a base station (BS), a message including the feature vector, and receiving, by the UE from the BS, a machine learning (ML) model, the ML model being trained, using the feature vector, to detect UE orientation.

Implementations can include one or more of the following features. For example, the message can further include UE information associated with orientation. The feature vector can include information associated with at least one of Reference Signal Received Power (RSRP) measurements, Signal to Interference and Noise Ratio (SINR) measurements, serving mobile terminal (MT) panel, serving receiver (Rx) beam, serving transmitter (Tx) beam(s), and UE orientation. The feature vector can include at least one of RSRPs of strongest beams to the BS, selected UE panel, Rx beam, and UE orientation per each reported RSRP. The ML model can map a set of RSRP, selected UE panel and selected Rx beam, and serving Tx beam(s) to the UE orientation. The method can further include determining, by the UE, at least one sensor failure, the sensor being associated with determining UE orientation, communicating, by the UE to the BS, a message indicating the sensor failure at the UE, and communicating, by the UE to the BS, a message including a request for the trained ML model. The communication including the request for the trained ML model can include UE device type information and UE sensor type information. The method can further include communicating, by the UE to the BS, a message including UE orientation determined using the ML model.

A non-transitory computer-readable storage medium comprising instructions stored thereon that, when executed by at least one processor, can be configured to cause a computing system to perform the methods described above. An apparatus comprising means for performing the methods described above. An apparatus comprising: at least one processor; and at least one memory including computer program code; the at least one memory and the computer program code configured to, with the at least one processor, cause the apparatus at least to perform the methods described above.

Computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The details of one or more examples of embodiments are set forth in the accompanying drawings and the description below. Other features will be apparent from the description and drawings, and from the claims.

BRIEF DESCRIPTION OF THE DRAWINGS

FIG. 7 is a flowchart illustrating operation of network device or base station (BS) according to an example embodiment.

DETAILED DESCRIPTION

Figure 1:
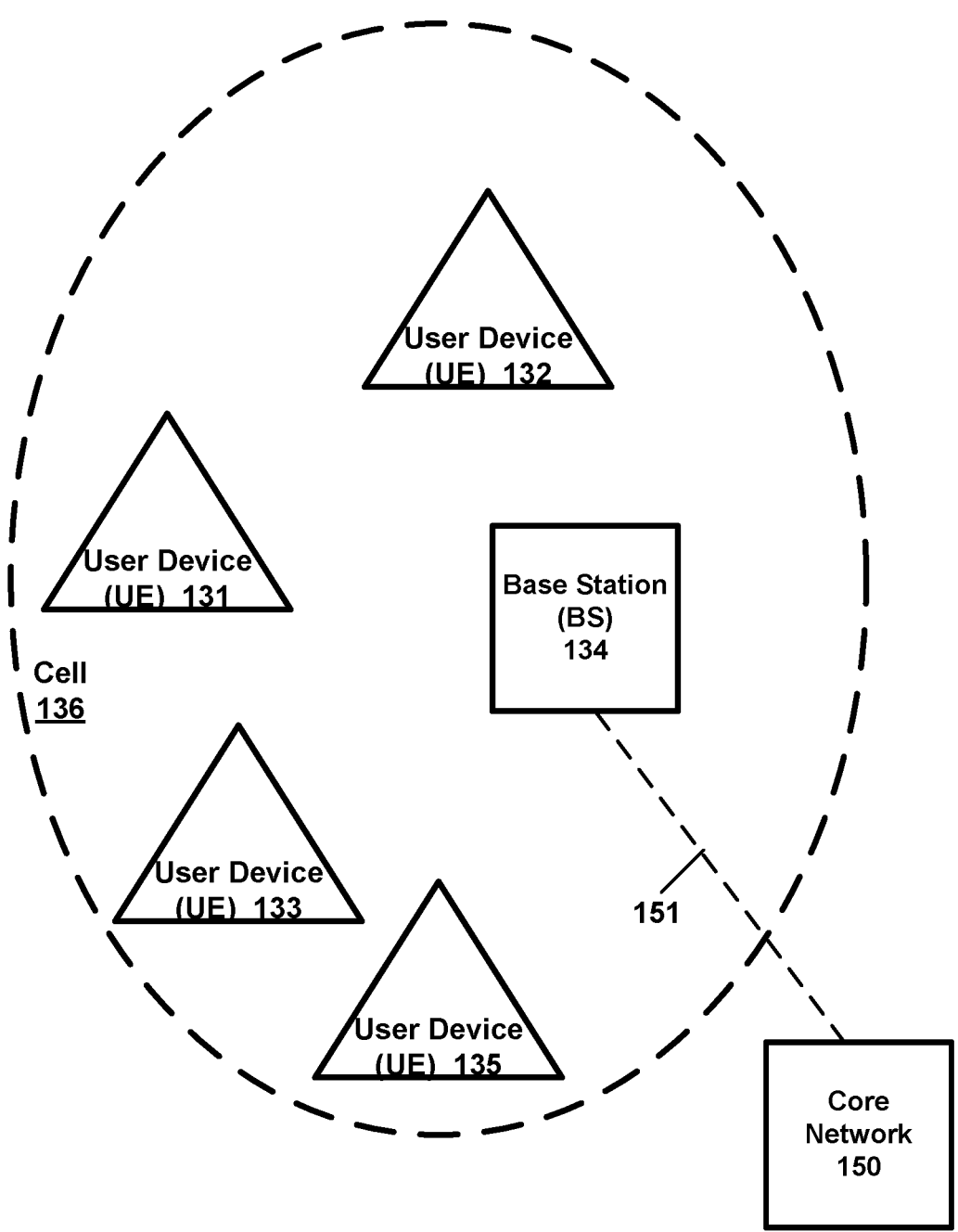
FIG. 1 is a block diagram of a wireless network according to an example embodiment.

FIG. 1 is a block diagram of a wireless network 130 according to an example embodiment. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a BS, next generation Node B (gNB), a next generation enhanced Node B (ng-eNB), or a network node. The terms user device and user equipment (UE) may be used interchangeably. A BS may also include or may be referred to as a RAN (radio access network) node, and may include a portion of a BS or a portion of a RAN node, such as (e.g., such as a centralized unit (CU) and/or a distributed unit (DU) in the case of a split BS). At least part of the functionalities of a BS (e.g., access point (AP), base station (BS) or (e) Node B (eNB), BS, RAN node) may also be carried out by any node, server or host which may be operably coupled to a transceiver, such as a remote radio head. BS (or AP) 134 provides wireless coverage within a cell 136, including to user devices (or UEs) 131, 132, 133 and 135. Although only four user devices (or UEs) are shown as being connected or attached to BS 134, any number of user devices may be provided. BS 134 is also connected to a core network 150 via a S1 interface or NG interface 151. This is merely one simple example of a wireless network, and others may be used.

A base station (e.g., such as BS 134) is an example of a radio access network (RAN) node within a wireless network. A BS (or a RAN node) may be or may include (or may alternatively be referred to as), e.g., an access point (AP), a gNB, an eNB, or portion thereof (such as a centralized unit (CU) and/or a distributed unit (DU) in the case of a split BS or split gNB), or other network node. For example, a BS (or gNB) may include: a distributed unit (DU) network entity, such as a gNB-distributed unit (gNB-DU), and a centralized unit (CU) that may control multiple DUs. In some cases, for example, the centralized unit (CU) may be split or divided into: a control plane entity, such as a gNB-centralized (or central) unit-control plane (gNB-CU-CP), and an user plane entity, such as a gNB-centralized (or central) unit-user plane (gNB-CU-UP). For example, the CU sub-entities (gNB-CU-CP, gNB-CU-UP) may be provided as different logical entities or different software entities (e.g., as separate or distinct software entities, which communicate), which may be running or provided on the same hardware or server, in the cloud, etc., or may be provided on different hardware, systems or servers, e.g., physically separated or running on different systems, hardware or servers.

As noted, in a split configuration of a gNB/BS, the gNB functionality may be split into a DU and a CU. A distributed unit (DU) may provide or establish wireless communications with one or more UEs. Thus, a DUs may provide one or more cells, and may allow UEs to communicate with and/or establish a connection to the DU in order to receive wireless services, such as allowing the UE to send or receive data. A centralized (or central) unit (CU) may provide control functions and/or data-plane functions for one or more connected DUs, e.g., including control functions such as gNB control of transfer of user data, mobility control, radio access network sharing, positioning, session management etc., except those functions allocated exclusively to the DU. CU may control the operation of DUs (e.g., a CU communicates with one or more DUs) over a front-haul (Fs) interface.

According to an illustrative example, in general, a BS node (e.g., BS, eNB, gNB, CU/DU, . . . ) or a radio access network (RAN) may be part of a mobile telecommunication system. A RAN (radio access network) may include one or more BSs or RAN nodes that implement a radio access technology, e.g., to allow one or more UEs to have access to a network or core network. Thus, for example, the RAN (RAN nodes, such as BSs or gNBs) may reside between one or more user devices or UEs and a core network. According to an example embodiment, each RAN node (e.g., BS, eNB, gNB, CU/DU, . . . ) or BS may provide one or more wireless communication services for one or more UEs or user devices, e.g., to allow the UEs to have wireless access to a network, via the RAN node. Each RAN node or BS may perform or provide wireless communication services, e.g., such as allowing UEs or user devices to establish a wireless connection to the RAN node, and sending data to and/or receiving data from one or more of the UEs. For example, after establishing a connection to a UE, a RAN node (e.g., BS, eNB, gNB, CU/DU, . . . ) may forward data to the UE that is received from a network or the core network, and/or forward data received from the UE to the network or core network. RAN nodes (e.g., BS, eNB, gNB, CU/DU, . . . ) may perform a wide variety of other wireless functions or services, e.g., such as broadcasting control information (e.g., such as system information) to UEs, paging UEs when there is data to be delivered to the UE, assisting in handover of a UE between cells, scheduling of resources for uplink data transmission from the UE(s) and downlink data transmission to UE(s), sending control information to configure one or more UEs, and the like. These are a few examples of one or more functions that a RAN node or BS may perform. A base station may also be DU (Distributed Unit) part of IAB (Integrated Access and Backhaul) node (a.k.a. a relay node). DU facilitates the access link connection(s) for an IAB node.

A user device (user terminal, user equipment (UE), mobile terminal, handheld wireless device, etc.) may refer to a portable computing device that includes wireless mobile communication devices operating either with or without a subscriber identification module (SIM) (which may be referred to as Universal SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, a sensor, and a multimedia device, as examples, or any other wireless device. It should be appreciated that a user device may also be (or may include) a nearly exclusive uplink only device, of which an example is a camera or video camera loading images or video clips to a network. A user device may be also MT (Mobile Termination) part of IAB (Integrated Access and Backhaul) node (a.k.a. a relay node). MT facilitates the backhaul connection for an IAB node.

In LTE (as an illustrative example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks. Other types of wireless networks, such as 5G (which may be referred to as New Radio (NR)) may also include a core network (e.g., which may be referred to as 5GC in 5G/NR).

In addition, by way of illustrative example, the various example embodiments or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), massive MTC (mMTC), Internet of Things (IoT), and/or narrowband IoT user devices, enhanced mobile broadband (eMBB), and ultra-reliable and low-latency communications (URLLC). Many of these new 5G (NR)-related applications may require generally higher performance than previous wireless networks.

IoT may refer to an ever-growing group of objects that may have Internet or network connectivity, so that these objects may send information to and receive information from other network devices. For example, many sensor type applications or devices may monitor a physical condition or a status and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of $10^{-5}$ and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability). Thus, for example, a URLLC UE (or URLLC application on a UE) may require much shorter latency, as compared to an eMBB UE (or an eMBB application running on a UE).

The various example embodiments may be applied to a wide variety of wireless technologies or wireless networks, such as LTE, LTE-A, 5G (New Radio (NR)), cmWave, and/or mmWave band networks, IoT, MTC, eMTC, mMTC, eMBB, URLLC, etc., or any other wireless network or wireless technology. These example networks, technologies or data service types are provided only as illustrative examples.

User equipment (UE) orientation is expected to play a role in 5G communications standards. For example, automated guided vehicles (AGVs) may be configured to determine location. However, the location of the UE can be insufficient for proper UE functioning. As a result, the UE orientation may be required for proper UE functioning. Further, XR technologies (e.g., extended reality, cross reality, augmented reality, and/or the like) may influence 5G technology needs for future industrial and/or commercial applications. The performance of XR technology can be directly (or indirectly) dependent on an orientation of the XR-device. As an example, future 5G systems may be required to support a mechanism to determine the UE's heading with an accuracy of better than 30 degrees (0.54 rad) and a positioning service availability of 99.9% for static users and with an accuracy of better than 10 degrees (0.17 rad) and a positioning service availability of 99% for users up to 10 km/h.

The above features may be applicable to both single panel and multi-panel UEs, which is in line with 5G capabilities. Each panel may have omni-directional antenna or directional antennas with grid of beams. The availability of multiple panels may give additional degree of freedom for UE positioning or orientation estimations.

Most UEs use internal sensors (e.g., an inertial measurement unit (IMU), a magnetic compass, a gyroscope, and/or the like) for detecting the orientation of the device. The reading of mechanical sensors can be affected by jitter and a surrounding magnetic field causing the accuracy of user orientation estimation to be reduced. These problems can be even more severe in indoor industrial environments. Further, a UE's internal sensors can be subject to failure due to, for example, mechanical arrangement, potentially risking many critical applications (e.g., in vehicle to anything (V2X), XR setup, and/or the like). There is growing interest of the development and/or deployment of radio access technology (RAT) dependent orientation estimation due to the aforementioned limitations of the internal UE sensors.

Unlike positioning of a UE, RAT dependent orientation estimation can be challenging because of the higher dynamics and/or variability (e.g., a position of UE can change with its speed, but orientation of UE can depend on a gesture of its users) associated with RAT. Thus, RAT dependent orientation estimation may require excessive overhead in gNB-UE signaling, as there should be a continuous observation. For example, UE orientation estimation may be possible. However, RAT dependent procedures can require continuous feedback, resulting in excessive overhead. Example implementations address the above problems (e.g., mechanical sensor failures, overhead in RAT based approach, and/or the like) by developing a machine learning (ML) based orientation estimation. Example implementations provide a procedure and signaling required for ML-training and obtaining a trained ML model from a server that hosts the model.

Detecting the orientation of the UE is may be a requirement to, for example, select the best panel at the UE to enable a strong communication link between the UE and the gNB or for virtual reality applications where the orientation must be known. However, in case the sensors fail, a fallback method may be necessary for proper operation of the system. Therefore, an advantage of example implementations described herein can be to provide a secondary method to assist the UE with orientation detection when sensor-based detection fails.

Another advantage can be that if the sensors fail at operating properly after some time of use, the described techniques can provide assistance in calibrating the sensor. In addition, a trained ML technique for detecting the orientation can be more power efficient (as compared to sensor use). Therefore, the trained ML technique can be used instead of the internal sensors. Another advantage of using trained ML techniques is that the technique(s) can be fast as the technique(s) may require a small set of arithmetic operations and reduce the latency. The use of XR applications may require low latency and high data rate. Another advantage of using trained ML techniques is that the technique(s) can be resource (e.g., power) reduction by using the trained ML techniques in place of mechanical sensors.

Figure 2A:
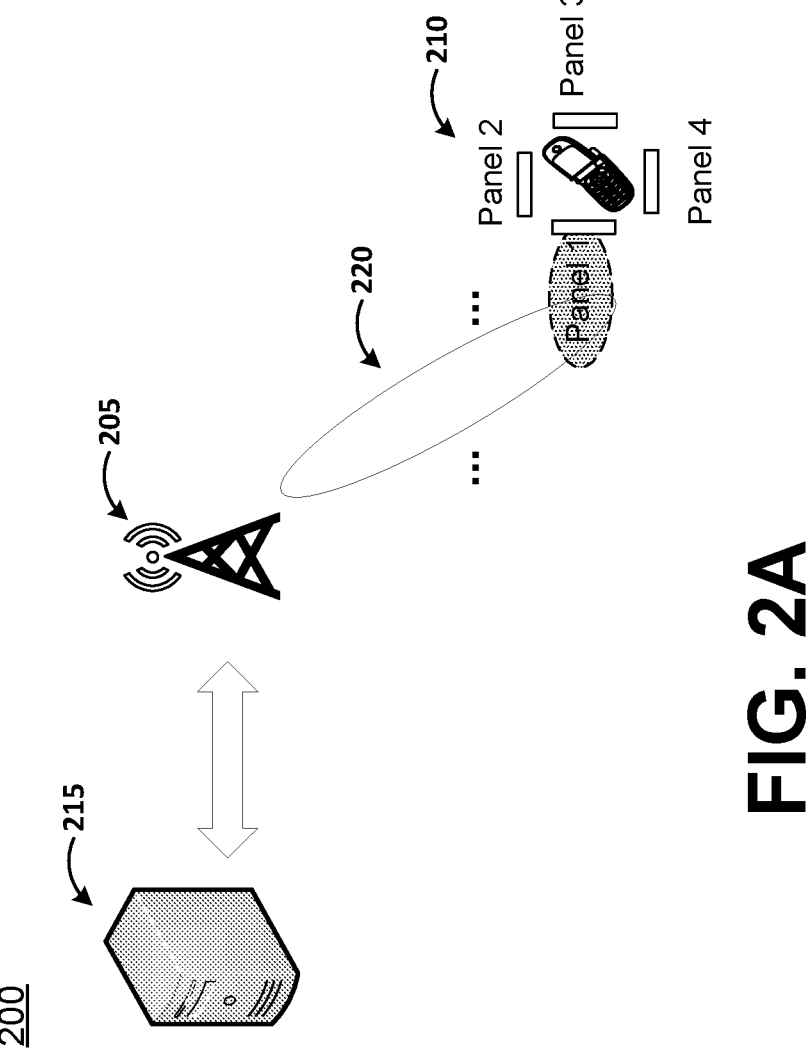
FIG. 2A is a diagram illustrating a network according to an example embodiment.
Figure 2B:
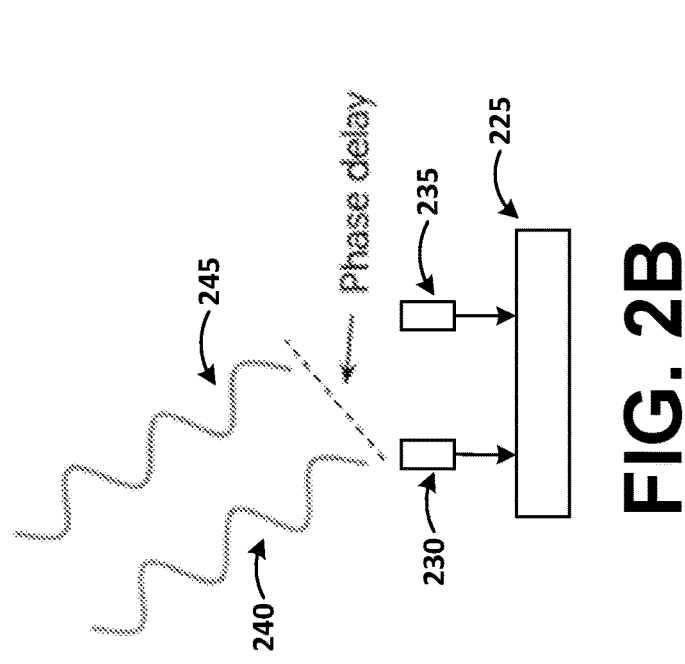
FIG. 2B is a diagram illustrating a signal reception according to an example embodiment.

FIG. 2A is a diagram illustrating a network according to an example embodiment. As shown in FIG. 2A, a network 200 includes, at least, a base station (BS) 205, a user equipment (UE) 210, and a server 215. The BS 205 can be communicatively (e.g., wireless) coupled to the UE 210. The BS 205 can be communicatively (e.g., wired or wireless) coupled to the server 215. The UE 210 can include a plurality of panels (e.g., panel 1, panel 2, panel 3, and panel 4). Each panel (four (4) are illustrated, but a UE can include more than 4 panels) may have omni-directional antenna or directional antennas with grid of beams. The availability of multiple panels may give additional degree of freedom for UE positioning or orientation estimations. For example, panel 1 of UE 210 includes a beam coupled to a beam 220 of the BS 205. Characteristics associated with the beam and/or panel can help determine the orientation of UE 210. FIG. 2B is used to illustrate one (of many) characteristics associated with the beam and/or panel that can help determine the orientation of UE 210.

FIG. 2B is a diagram illustrating a signal reception according to an example embodiment. As shown in FIG. 2B a panel (e.g., panel 1) can include a beamformer 225, an antenna 230, and an antenna 235. Because the UE 210 can have multiple antennas (e.g., two antennas), UE 210 can be configured to determine an angle-of-arrival (AoA) of one or more beams 240, 245 by comparing phase shifts over multiple antennas using beamforming techniques. The beamformer 225 can generate an angle $\theta$ (based on a phase delay). The AoA of the beam in the horizontal plane ($\theta$) and in the horizontal plane ($\phi$) can be determined. Additional angles could be resolved with three or more antennas. The AoA can be one (of many) techniques used to help determine the orientation of UE 210.

In an example implementation, a secondary trained machine learning (ML) model can be available at a server, the ML model can be transferred to a UE through the base station (BS). The ML model can be trained using various UE data samples and a known orientation as the label. Once trained to an accuracy criterion (e.g., a threshold level of accuracy), the trained ML model can be used to determine the orientation of the UE (or similar (e.g., same model, same hardware) UE). The training process can be done in a server that collects all the information and has computational power to train the ML model. For example, UEs can have limited computation resources, therefore a UE may not be an optimal training device. Developing ML models is sometimes performed with a human expert that understands the design of the ML model. Training may also be performed by a network device because some automated (e.g., without human intervention) ML training programs (e.g., AutoML) can require many computational resources.

Example implementations include a procedure and the signaling necessary to train a ML model and to obtain a trained ML model from a server that hosts the ML model to be used at the UE. This secondary method of orientation estimation can use 3GPP based signals for detection of the orientation, rather than using the internal sensors of the device. An example technique can be first, a BS collects a dataset that can be used for orientation detection ML model training. The dataset can include a feature vector and a corresponding orientation. There are available mechanisms in 3GPP to transfer the orientation information from the UE to the gNB. Orientation information can be sent from the UE to the BS using, for example, an orientationMeasReport message. The BS can use servers to train a ML model that is configured to use the feature vector to determine the orientation. The trained ML model can be transferred to the UE for orientation detection purpose. FIG. 3A can be used to describe the details of this process flow.

FIG. 3A is a block diagram of a signal flow according to an example embodiment. As shown in FIG. 3A, a signal flow 300 includes communications between the BS 205, the UE 210 and the server 215. The UE 210 communicates (305) (e.g., a message or signals) feature vectors and orientation to the BS 205. For example, referring to FIG. 3B, data can be collected from the UE 210 at the BS 205 at during predefined time intervals 350. The trained model can be transferred during predefined time intervals 355 to be used at UE 210. This will enable constant updates to the ML model, which will result in better ML model performance as well as less energy consumption at the UE.

Figure 3B:
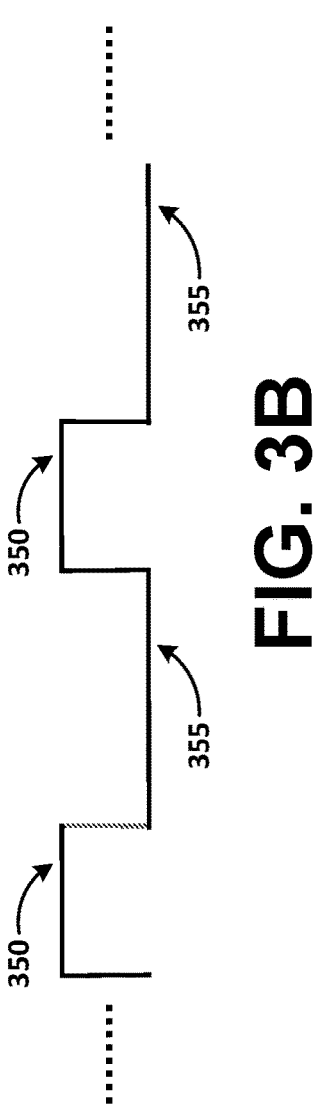
FIG. 3B is a timing diagram according to an example embodiment.
Figure 3A:
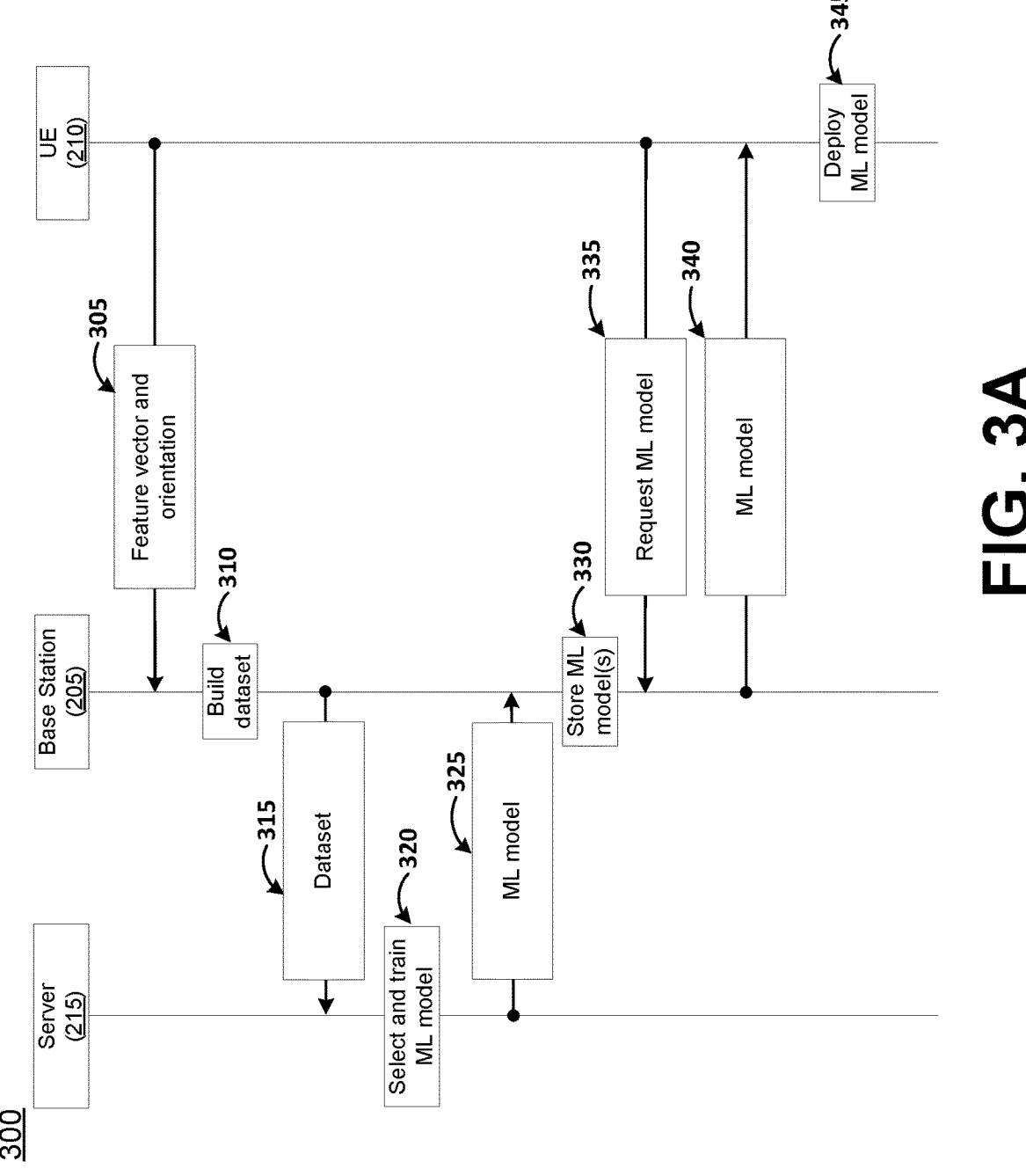
FIG. 3A is a block diagram of a signal flow according to an example embodiment.
Figures 3C, 3D, 3E, 3F:
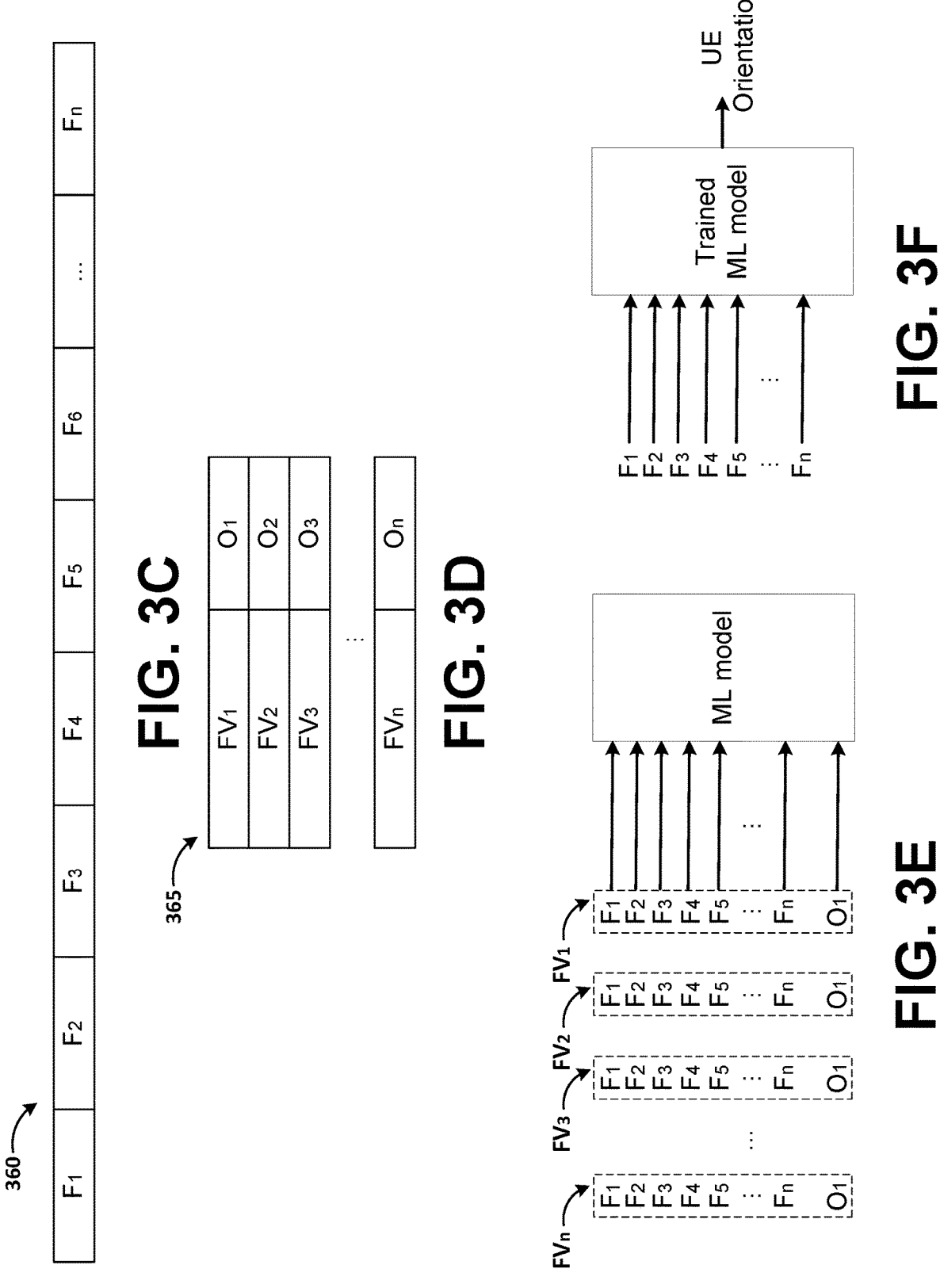
FIG. 3C is a block diagram of a data structure for a feature vector according to an example embodiment.
FIG. 3D is a block diagram of a data structure for a feature vector dataset according to an example embodiment.
FIG. 3E is a block diagram of a signal flow associated with training a machine learning model using a feature vector dataset according to an example embodiment.
FIG. 3F is a block diagram of a signal flow for determining a user equipment orientation based on a feature vector using a trained machine learning model according to an example embodiment.

Now referring to FIG. 3C, a feature vector 360 can include a plurality of features $F_1$, $F_2$, $F_3$, $F_4$, $F_5$, $F_6$, . . . , $F_n$. Each of the plurality of features can be a UE measurement that can be used to train a ML model to determine an orientation of the UE. Each of the plurality of features can be a UE measurement that can be used to determine an orientation of the UE using a trained ML model. Training the ML model and/or using the trained model to determine orientation of the UE can include using a subset of features $F_1$-$F_n$ in the feature vector 360.

The feature vector 360 can be reported to the BS 205 all together in a message associated with the communication 305. However, one or more of the features $F_1$-$F_n$ may be communicated to the BS 205 individually or in subsets. In other words, one or more of the features $F_1$-$F_n$ can be reported to the BS 205 using existing 3GPP mechanisms. Then, the BS 205 can build the feature vector 360 using the one or more of the separately communicated features $F_1$-$F_n$. For example, the UE 210 can be configured to periodically measure the RSRP of CSI-RS resources, SS/PBCH Block resources or both CSI-RS and SS/PBCH Block resource and report L1-RSRP measurements of up to four beams (e.g., of the strongest four beams [TS 38.214]). The UE 210 may have multiple panels and the UE 210 may associate the MT panel the UE 210 used to compute the RSRP of the reported beams. Each MT panel can consist of multiple Rx beams.

Features $F_1$-$F_n$ included in the feature vector 360 can be defined in future standards. For example, L1-SINR is not currently specified in 3GPP and could be included as a feature in the feature vector 360 if such a measurement(s) are specified in the future.

In an example implementation, the feature vector 360 can be a vector of tuples that consists of Tx beams (SSB and/or CSI-RS) each associated with the L1-RSRP, L1-SINR, MT panel ID, Rx beam ID, AoA, AoD, and/or RSTD. For example, one or more of the features $F_1$-$F_n$ can be a tuple. The feature vector 360 can be transmitted from the UE 210 to the BS 205 using existing Information Elements (IEs) and/or new IEs. Some of the existing IEs can be modification to accommodate more information. For example, the L1-RSRP report can be modified to additionally include L1-SINR, MT panel ID and/or Rx beam ID.

Returning to FIG. 3A, the BS 205 can build (310) a dataset. The dataset can include at least one feature vector and corresponding orientation illustrated as dataset 365 in FIG. 3D. The dataset 365 can be communicated (315) (e.g., a message or signals) to the server 215 from the BS 205. The network device can select and train a ML model (320). Selecting a ML model can include selecting a ML model that is appropriate for the UE 210 and/or the UE 210 hardware. In an alternate (or additional) implementation, the BS 205 can select the ML model and the Server 215 can train the ML model. Training the ML model can include using each of the feature vectors $FV_1$, $FV_2$, $FV_3$, . . . , $FV_n$ and corresponding orientations $O_1$, $O_2$, $O_3$, . . . , $O_n$ in the dataset 360. As shown in 3E, training the ML model can include inputting each feature vector (e.g., $FV_1$) and corresponding orientation (e.g., $O_1$) one at a time as illustrated in FIG. 3E.

Returning to FIG. 3A, the trained ML model (or models) can be communicated (325) (e.g., a message or signals) to the BS 205 from the server 215. The server 215 can store (330) the trained ML model(s). In an alternate (or additional) implementation, the server 215 can store the trained ML model(s). In this implementation, the server 215 can communicate the trained ML model (e.g., one model at a time) to the BS 205 in response to a request for the trained ML model from the BS 205. This request can include information about the UE 210 and/or the UE 210 hardware (e.g., sensors). The stored ML model(s) can be stored in relation to the UE 210 and/or the UE 210 hardware so that more than one UE can use a ML model via a look-up of the ML model.

Figure 4:
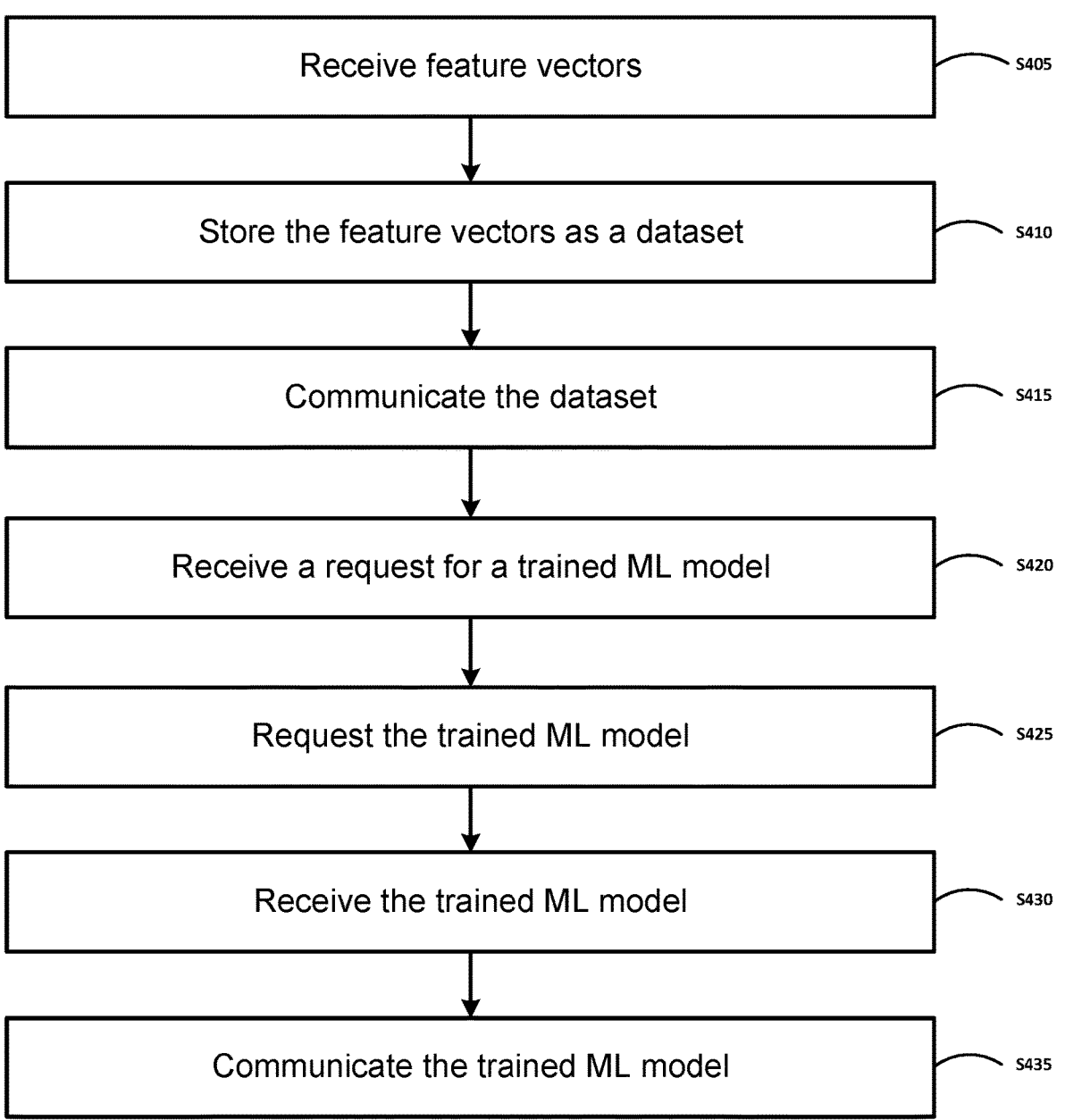
FIG. 4 is a flow diagram illustrating a method of operating a base station according to an example embodiment.
Figure 5:
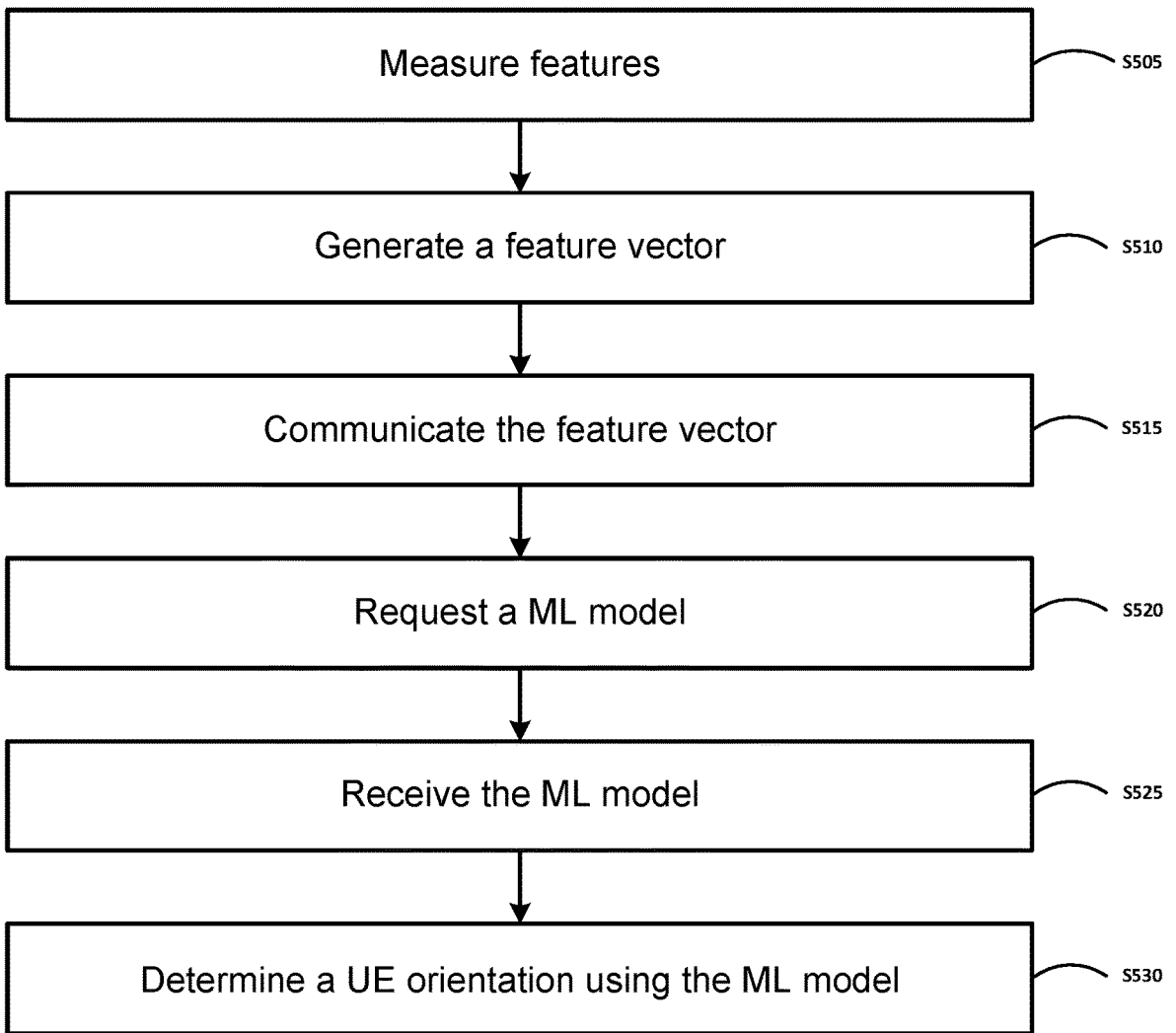
FIG. 5 is a flow diagram illustrating a method of operating a user equipment according to an example embodiment.
Figure 6:
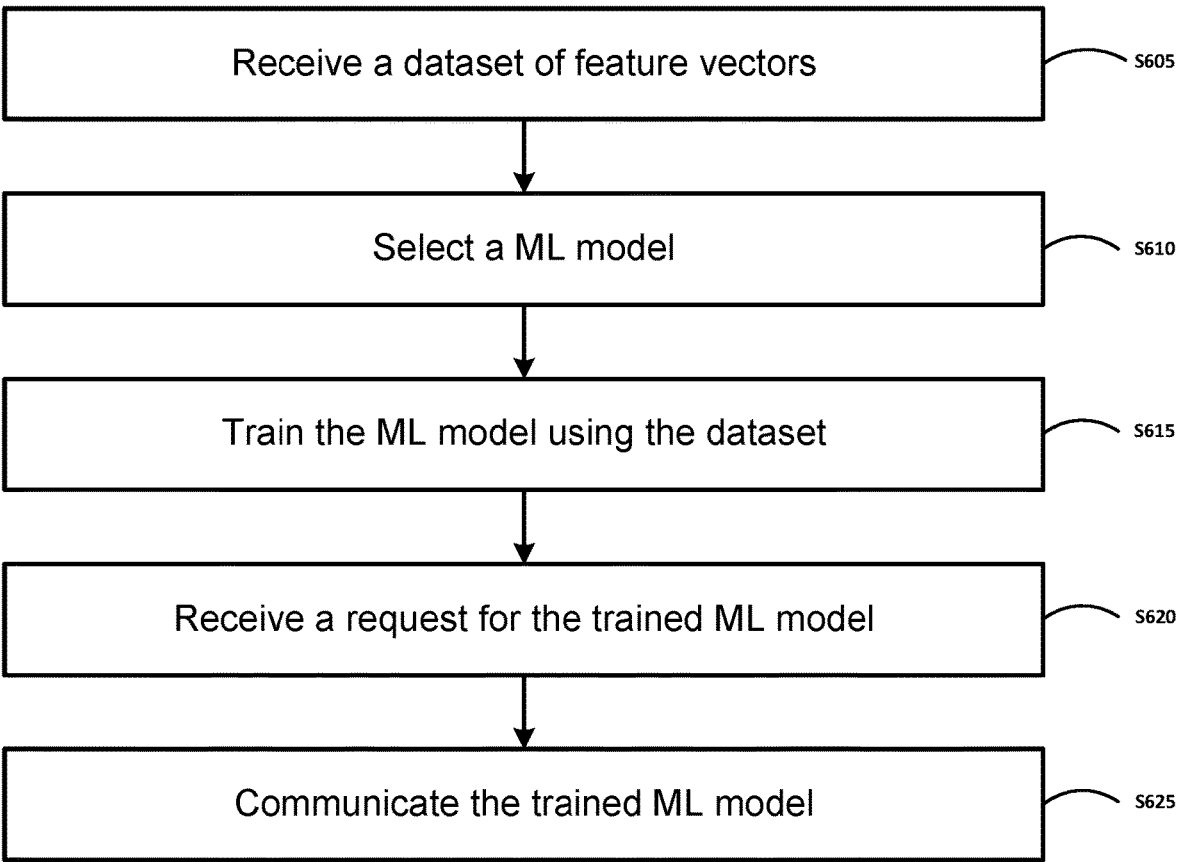
FIG. 6 is a flow diagram illustrating a method of operating a network device according to an example embodiment.

The UE 210 communicates (335) (e.g., a message or signals) a request for a ML model to the BS 205. The request can include information (e.g., model type, sensor type, and/or the like). The BS 205 acquires the requested ML model (e.g., from the stored ML models) and communicates (340) (e.g., a message or signals) the ML model to the UE 210. The UE 210 then deploys the ML model (345). In other words, the UE 210 uses the ML model to determine an orientation of the UE 210. Using the trained ML model to determine orientation can include using each feature (e.g., $F_1$, $F_2$, $F_3$, $F_4$, $F_5$, . . . , $F_n$) used to train the ML model as illustrated in FIG. 3F. FIGS. 4-6 describe the operation of the BS 205, the UE 210 and the server 215 in more detail.

FIG. 4 is a flow diagram illustrating a method of operating a base station according to an example embodiment. As shown in FIG. 4, in step S405 feature vectors are received. For example, feature vectors and the corresponding orientation are received by the BS 205 from the UE 210. A feature vector can be a vector that contains information that can be used by a trained ML model (when deployed). The UE 210 should send the collected data to BS 205 for training purposes. Therefore, the content of the data should be decided in advance (e.g., predetermined).

The feature vector may include AoA, AoD, RSTD, Reference Signal Received Power (RSRP), Signal to Interference and Noise Ratio (SINR), and/or the like measurements. The measurements may be filtered, for example, averaging the RSRP measurements over a time window to get L1-RSRP. For example, UE 210 can periodically measure these features and reports, for example, up to 4 strongest beams to the BS 205. This report may additionally include the selected UE panel and the Rx/Tx beams IDs (if available). In addition, the feature vector can include constant biases of the sensors to learn and compensate them. Another element of the feature vector can be the location information of the UE. The location can help in building an ML model that takes the location information into account, and possible correlation between the location information and the other elements of the feature vector.

In step S410 the feature vectors are stored as a dataset. For example, the BS 205 can store at least one feature vectors and the corresponding orientation organized as a dataset (e.g., a data structure) in a memory of the BS 205. In step S415 the dataset is communicated. For example, the BS 205 can communicate the dataset to the server 215.

In step S420 a request for a trained ML model is received. For example, the UE 210 can request a trained ML model. The UE 210 may request the model because, for example, a sensor associated with orientation measurements has failed and/or the UE 210 triggers a power saving mode. The request can include UE 210 information (e.g., model, hardware, and/or the like). In an alternate (or additional) implementation, the BS 205 can cause the ML model to be communicated to the UE 210 without a request for the trained ML model from the UE 210 (e.g., without step S420). For example, should a highly accurate trained ML model be built and/or available at the server 215. The BS

205 may initiate the trained ML model transfer process in order to, for example, reduce (or help reduce) operating power of the UE 210.

In step S425 the trained ML model is requested. For example, the BS 205 can request the trained ML model from a memory of the BS 205 and/or the server 215. In response to the request, in step S430 the trained ML model is received. For example, the trained ML model can be received from one of the memory of the BS 205 and/or the server 215 (e.g., as a message or signal). In step S435 the trained ML model is communicated. For example, the trained ML model can be communicated (e.g., as a message or a signal) from the BS 205 to the UE 210 that requested the trained ML model.

FIG. 5 is a flow diagram illustrating a method of operating a user equipment according to an example embodiment. As shown in FIG. 5, in step S505 features are measured. For example, the UE 210 can make measurements (e.g., of 3GPP (or RAT) parameters or characteristics) corresponding to information that can be used by a trained ML model (when deployed). The collected information can be for training purposes. Therefore, the content of the data should be decided in advance (e.g., predetermined).

In step S510 a feature vector is generated. For example, the feature vector can be generated based on the measured features. The feature vector may include AoA, AoD, RSTD, RSRP, SINR, and/or the like measurements. The measurements may be filtered, for example, averaging the RSRP measurements over a time window to get L1-RSRP. For example, UE 210 can periodically measure these features and reports, for example, up to 4 strongest beams to the BS 205. This report may additionally include the selected UE panel and the Rx/Tx beams IDs (if available). In addition, the feature vector can include constant biases of the sensors to learn and compensate them. Another element of the feature vector can be the location information of the UE. The location can help in building an ML model that takes the location information into account, and possible correlation between the location information and the other elements of the feature vector.

In step S515 the feature vector is communicated. For example, the UE 210 can communicate (e.g., as a message or a signal) the feature vector to the BS 205. In an example implementation, the UE 210 can communicate the feature vector to the BS 205 on a regular (e.g., time-based) interval (e.g., see FIG. 3B time intervals 350).

In step S520 a ML model is requested. For example, the UE 210 can communicate (e.g., as a message or a signal) a request for a train ML model to the BS 205. The UE 210 may request the model because, for example, a sensor associated with orientation measurements has failed and/or the UE 210 triggers a power saving mode. The request can include UE 210 information (e.g., model, hardware, and/or the like). In an alternate (or additional) implementation, the BS 205 can cause the ML model to be communicated to the UE 210 without a request for the trained ML model from the UE 210 (e.g., without step S420). For example, should a highly accurate trained ML model be built and/or available at the server 215. The BS 205 may initiate the trained ML model transfer process in order to, for example, reduce operating power of the UE 210.

In step S525 the ML model is received. For example, in response to the request, a trained ML model can be communicated (e.g., as a message or a signal) from the BS 205 to the UE 210. In an alternate (or additional) implementation, the BS 205 can cause the ML model to be communicated to the UE 210 without a request for the trained ML model from the UE 210 (e.g., without step S520). For example, should a highly accurate trained ML model be built and/or available at the server 215. The BS 205 may initiate the trained ML model transfer process in order to, for example, reduce operating power of the UE 210.

In step S530 a UE orientation is determined using the ML model. For example, the trained ML model can be deployed on the UE 210. The deployment may be performed in of several ways depending on the software architecture of the device. Usually, ML model deployment can include reading the trained ML model file. The trained ML model file can be converted to other data structure formats and transferred and deployed in various programming environments. For example, the trained ML model can be saved in Python using a save method of a TensorFlow model class (e.g., sequential class of TensorFlow). On the other hand, deploying the trained ML model can be done using a load method of the same class. Once the trained ML model is loaded, the trained ML model can be used as a function that maps the inputs to the outputs by calling a, for example, predict (e.g., predict orientation) method of the trained ML model.

In an example implementation, the UE 210 can determine an orientation on a regular (e.g., time-based) interval (e.g., see FIG. 3B time intervals 355). The UE 210 begins using the trained ML model for detecting the orientation by using the feature vector at any given moment. The feature vector can have the same format as the vector that was used in the training. Feature vector pre-processing methods can be included in the model information that is transferred from the BS 205 to the UE 210.

FIG. 6 is a flow diagram illustrating a method of operating a network device according to an example embodiment. As shown in FIG. 6, in step S605 a dataset of feature vectors is received. For example, a dataset including feature vectors can be received from the BS 205. The feature vectors can correspond to information that can be used by a trained ML model (when deployed). The data set can include orientation information associated with the feature vectors. The feature vector may include AoA, AoD, RSTD, RSRP, SINR, and/or the like measurements. The measurements may be filtered, for example, averaging the RSRP measurements over a time window to get L1-RSRP. The feature vector includes information associated with at least one of RSRP measurements, serving MT panel, serving Rx beam, serving Tx beam(s), and UE orientation. For example, UE 210 can periodically measure these features and reports, for example, up to 4 strongest beams to the BS 205. This report may additionally include the selected UE panel and the Rx/Tx beams IDs (if available). In addition, the feature vector can include constant biases of the sensors to learn and compensate them. Another element of the feature vector can be the location information of the UE. The location can help in building an ML model that takes the location information into account, and possible correlation between the location information and the other elements of the feature vector.

In step S610 a ML model is selected. For example, a ML model can be selected based on at least one of a type (e.g., manufacturer, model number) of the UE 210 and/or a type of sensor (e.g., a gyroscope) installed in the UE 210. The dataset can include the information associated with the UE 210. Alternatively, or in addition, the BS can identify (to the server 215) the ML model to be selected and/or the information associated with the UE 210. In other words, the BS 205 can determine the ML model to be trained and/or the server 215 can determine the ML model to be trained.

In step S615 the ML model is trained using the dataset. For example, the network device can train the ML model based on (e.g., using as input) the feature vectors and the associated orientation included in the dataset. In an example implementation, a target orientation, which is the UE 210 orientation that is determined using a sensor and/or using 3GPP-based measurements (e.g., as included in the dataset) can be used as the label in the learning process (e.g., the output of the ML model is compared to the real value, which is the label or ground truth). The server 215 can perform the training process because of, for example, a BS handover. As a result, instead of having to transfer the incomplete training process from one BS to another for the ML training to be complete. Accordingly, the training can run in the centralized entity, such that training is not affected by potential handovers. Once the training is done, the ML models can be stored at the server 215 and/or the BS 205 and transferred upon the request from the UE 210.

In step S620 a request for the trained ML model is received. For example, the server 215 can receive a communication (e.g., as a message or a signal) including a request for a trained ML model from the BS 205. The BS 205 can communicate the request in response to a request for a trained ML from the UE 210. The UE 210 can communicate (e.g., as a message or a signal) a request for a train ML model to the BS 205. The UE 210 may request the model because, for example, a sensor associated with orientation measurements has failed and/or the UE 210 triggers a power saving mode. The request can include UE 210 information (e.g., model, hardware, and/or the like). In an alternate (or additional) implementation, the BS 205 can cause the ML model to be communicated to the UE 210 without a request for the trained ML model from the UE 210. For example, should a highly accurate trained ML model be built and/or available at the server 215. The BS 205 may initiate the trained ML model transfer process in order to, for example, reduce operating power of the UE 210.

In step S625 the trained ML model is communicated. For example, in response to the request, a trained ML model can be communicated (e.g., as a message or a signal) from the server 215 to the BS 205. In an alternate (or additional) implementation, the BS 205 can request the trained model from the server 215 and cause the trained ML model to be communicated to the UE 210 without a request for the trained ML model from the UE 210. For example, should a highly accurate trained ML model be built and/or available at the server 215. The BS 205 may initiate the trained ML model transfer process in order to, for example, reduce operating power of the UE 210.

Example implementations can be described as having three (3) modes for starting the ML model evaluation and transfer. In a first mode (UE sensor failure), the UE 210 can have a mechanism to inform the BS 205 about a failure of the sensors. In this mode, the UE 210 can trigger the ML model transfer process. In one scenario, the UE 210 can communicate a periodic sensor information update to the BS 205. In another scenario, the UE 210 can communicate a message to BS 205 only when the sensors fail. In a second mode (UE triggers power saving mode), even if the sensors are operating properly, the UE may initiate a power saving mode by shutting down the operation of its internal sensors and deploy ML mode for orientation estimation. In a third mode (highly accurate ML model available), a highly accurate ML model can be built and/or available at the server 215. The BS 205 may initiate the ML model transfer process in order to save operating power of the UE.

In the first mode and the second mode (which are triggered by UE), example implementations can include the following procedure to transfer the ML model to UE (as a note, this procedure is generally or in detail described above with regard to FIGS. 3A-5). The UE 210 sends a request for availability of ML models. The UE 210 can send information such as device type and sensor type to the BS 205. The BS 205 selects the trained ML model and evaluates the accuracy of the model based on the test dataset available at the server 215. The ML models can be neural networks that are trained by a framework such as TensorFlow. Various ML models with different neural network architectures and hyper-parameters can have been trained for different datasets. For example, testing the performance of the model in TensorFlow can be performed using a tf.keras.evaluate Tensorflow method.

The ML model selection can be based on a device model or based on sensor model. Once the trained ML model is selected, the evaluation can be done using a test dataset. For an ML task like this, usually the metric that is used is MSE. Based on the accuracy of the model, BS 205 takes one of the following actions: The ML model is accurate enough—BS 205 informs the UE 210 about the model transfer; The ML model is not accurate enough—the BS 205 informs the UE 210 and terminates the process.

If the model is accurate enough, the BS 205 triggers the trained ML model transfer, the UE 210 receives the trained ML model and deploys the received trained ML model. The deployment may be done in several ways depending on the software architecture of the device. For example, the trained ML model deployment can include reading the trained ML model file (e.g., in the .h5 format). This trained ML model file can be also converted to other data structure formats and transferred and deployed in various programming environments. For example, the trained ML model in Python is saved by using save method of TensorFlow Keras model class (e.g., Sequential class of TensorFlow). On the other hand, deploying the trained ML model can be done using the load method of the same class. Once the trained ML model is loaded, the trained ML model can be used as a function that maps the inputs to the outputs by calling predict method of the trained ML model.

In the third mode (which is triggered by BS), example implementations can include the following procedure to transfer the ML model to UE (as a note, this procedure is generally or in detail described above with regard to FIGS. 3A-5). The BS 205 can inform the availability of a highly accurate trained ML model for orientation. This indicates that the BS 205 has the trained ML model of the UE/sensor and a dataset that is used to train and test a model. In response to a UE 210 ACK, the BS 205 triggers the trained ML model transfer.

The UE 210 can receive the trained ML model and deploys the received trained ML model. The deployment may be done in several ways depending on the software architecture of the device. For example, the trained ML model deployment can include reading the trained ML model file (e.g., in the .h5 format). This trained ML model file can be also converted to other data structure formats and transferred and deployed in various programming environments. For example, the trained ML model in Python is saved by using save method of TensorFlow Keras model class (e.g., Sequential class of TensorFlow). On the other hand, deploying the trained ML model can be done using the load method of the same class. Once the trained ML model is loaded, the trained ML model can be used as a function that maps the inputs to the outputs by calling predict method of the trained ML model.

Training (e.g., training the orientation prediction elements) can include, for example, supervised training and unsupervised training. Supervised training includes a target/ outcome variable (e.g., a label, a ground truth or dependent variable) to be predicted from a given set of predictors (independent variables). Using these set of variables, a function that can map inputs to desired outputs is generated. The training process continues until the model achieves a desired level of accuracy based on training data. Unsupervised training includes use of a machine learning algorithm to draw inferences from datasets consisting of input data without labeled responses. Other types of training (e.g., hybrid and reinforcement) can also be used.

The training of a ML model can continue until a desired level of accuracy is reached. Determination of the level of accuracy can include using a loss function. For example, loss functions can include hinge loss, logistic loss, negative log likelihood, and the like. Loss functions can be minimized to indicate a sufficient level of accuracy of the ML model training has been reached. Regularization can also be used. Regularization can prevent overfitting. Overfitting can be prevented by making weights and/or weight changes sufficiently small to prevent training (e.g., never ending) training.

Computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

SOME EXAMPLE ADVANTAGES

Example 1. FIG. 7 is a flowchart illustrating operation of network device or base station (BS). Operation S705 includes receiving, by a base station (BS) from a user equipment (UE), a communication including a feature vector. Operation S710 includes storing, by the BS, a dataset including pone or more feature vectors associated with the UE. Operation S715 includes communicating, by the BS to a network device, the dataset associated with the UE. Operation S720 includes receiving, by the BS from the network device, a machine learning (ML) model, the ML model being trained, using the dataset, to detect UE orientation. Operation S725 includes communicating, by the BS to the UE, the trained ML model.

Example 2. The method of Example 1, wherein the dataset can include UE information associated with orientation.

Example 3. The method of Example 1 or Example 2, wherein the feature vector can include information associated with at least one of Reference Signal Received Power (RSRP) measurements, Signal to Interference and Noise Ratio (SINR) measurements, serving mobile terminal (MT) panel, serving receiver (Rx) beam, serving transmitter (Tx) beam(s), and UE orientation.

Example 4. The method of any of Example 1 to Example 3, wherein the feature vector can include at least one of RSRPs of strongest beams to the BS, selected UE panel, Rx beam, and UE orientation per each reported RSRP.

Example 5. The method of any of Example 1 to Example 4, wherein the ML model maps a set of RSRP, selected UE panel and selected Rx beam, and serving Tx beam(s) to the UE orientation.

Example 6. The method of any of Example 1 to Example 5, can further include receiving, by the BS from the UE, a communication indicating a sensor failure at the UE, and receiving, by the BS from the UE, a communication including a request for the trained ML model, wherein the receiving of the trained ML model by the BS from the network device is in response to a request for the ML model based on the communication of the request for the trained model from the UE.

Example 7. The method of Example 6, wherein the communication including the request for the trained ML model received from the UE can include UE device type information and UE sensor type information.

Example 8. The method of Example 6 or Example 7, wherein the request for the trained ML model communicated to the network device can include UE device type information and UE sensor type information.

Example 9. The method of any of Example 1 to Example 8, can further include selecting, by the BS, the ML model, and evaluating, by the BS, an accuracy of the trained ML model based a test dataset, wherein the communicating of the trained ML model by the BS is in response to determining the trained ML model meets an accuracy criterion.

Example 10. The method of any of Example 1 to Example 9, can further include receiving, by the BS from the UE, a communication including UE orientation determined using the ML model.

Figure 8:
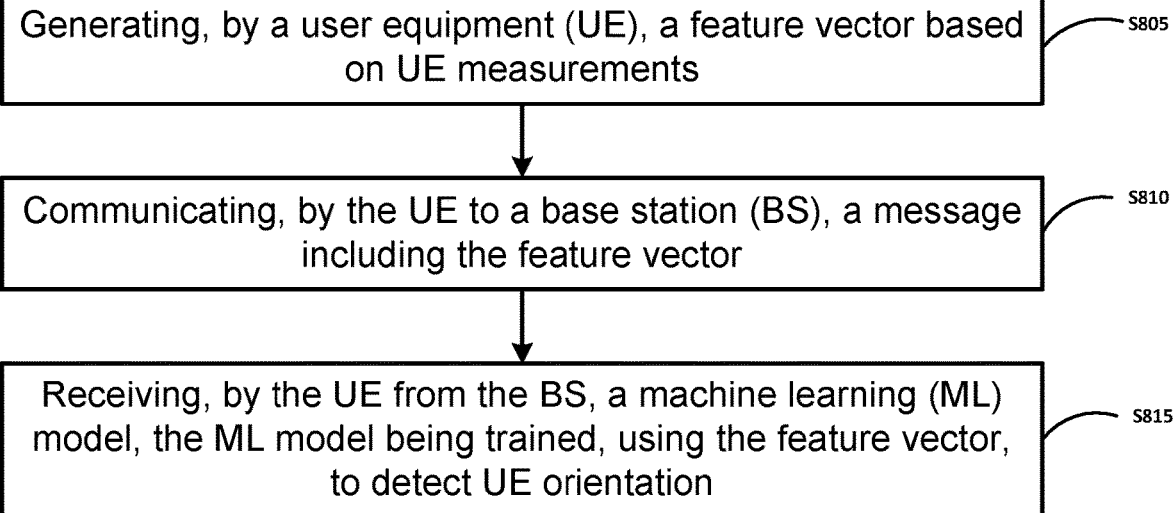
FIG. 8 is a flowchart illustrating operation of a user equipment according to an example embodiment.

Example 11. FIG. 8 is a flowchart illustrating operation of a user equipment. Operation S805 includes generating, by a user equipment (UE), a feature vector based on UE measurements. Operation S810 includes communicating, by the UE to a base station (BS), a message including the feature vector. Operation S815 includes receiving, by the UE from the BS, a machine learning (ML) model, the ML model being trained, using the feature vector, to detect UE orientation.

Example 12. The method of Example 11, wherein the message can further include UE information associated with orientation.

Example 13. The method of Example 11 or Example 12, wherein the feature vector can include information associated with at least one of Reference Signal Received Power (RSRP) measurements, Signal to Interference and Noise Ratio (SINR) measurements, serving mobile terminal (MT) panel, serving receiver (Rx) beam, serving transmitter (Tx) beam(s), and UE orientation.

Example 14. The method of any of Example 11 to Example 13, wherein the feature vector can include at least one of RSRPs of strongest beams to the BS, selected UE panel, Rx beam, and UE orientation per each reported RSRP.

Example 15. The method of any of Example 11 to Example 14, wherein the ML model can map a set of RSRP, selected UE panel and selected Rx beam, and serving Tx beam(s) to the UE orientation.

Example 16. The method of any of Example 11 to Example 15, can further include determining, by the UE, at least one sensor failure, the sensor being associated with determining UE orientation, communicating, by the UE to the BS, a message indicating the sensor failure at the UE, and communicating, by the UE to the BS, a message including a request for the trained ML model.

Example 17. The method of Example 16, wherein the communication including the request for the trained ML model can include UE device type information and UE sensor type information.

Example 18. The method of any of Example 11 to Example 17, can further include communicating, by the UE to the BS, a message including UE orientation determined using the ML model.

Example 19. A non-transitory computer-readable storage medium comprising instructions stored thereon that, when executed by at least one processor, are configured to cause a computing system to perform the method of any of Examples 1-18.

Example 20. An apparatus comprising means for performing the method of any of Examples 1-18.

Example 21. An apparatus comprising: at least one processor; and at least one memory including computer program code; the at least one memory and the computer program code configured to, with the at least one processor, cause the apparatus at least to perform the method of any of Examples 1-18.

Computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

Figure 9:
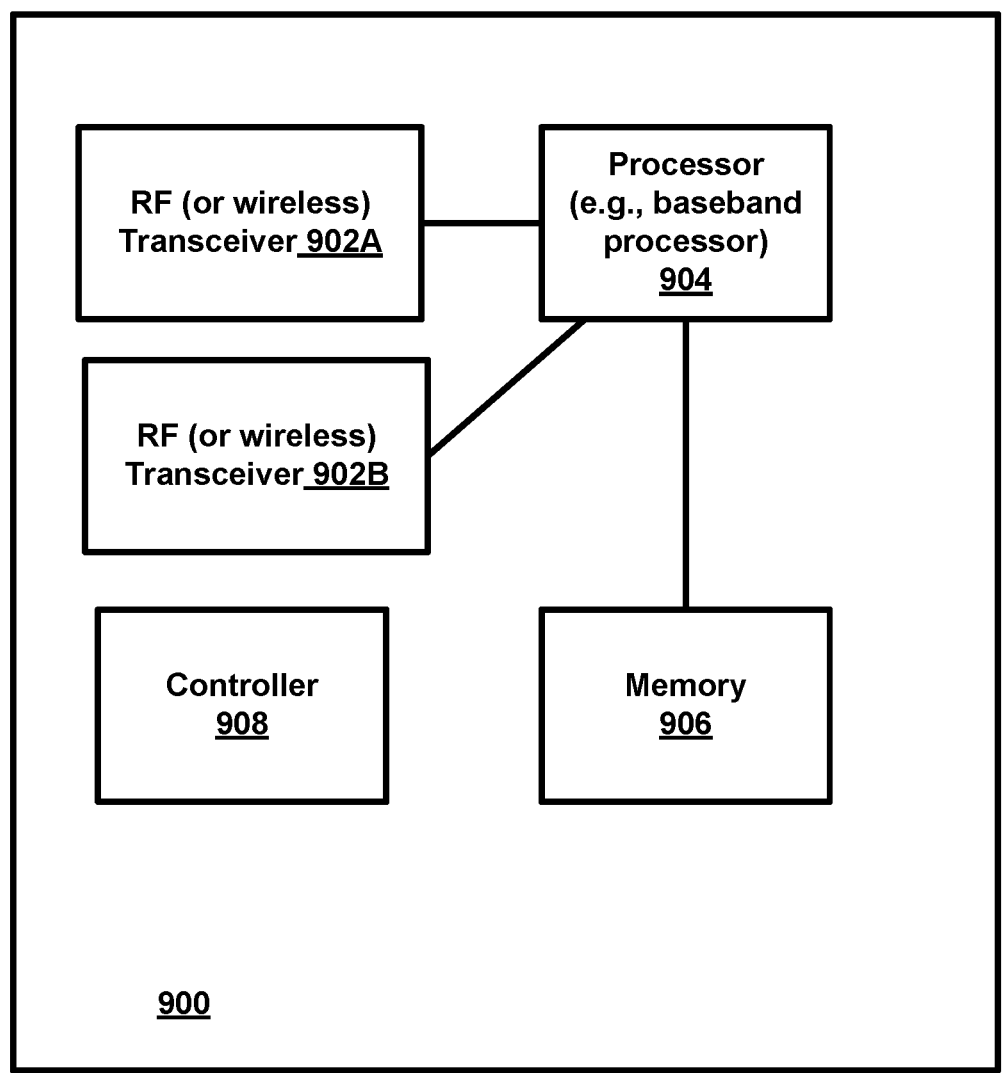
FIG. 9 is a block diagram of a wireless station or wireless node (e.g., AP, BS, gNB, RAN node, relay node, UE or user device, network node, network entity, DU, CU-CP, CU-CP, . . . or other node) according to an example embodiment.

FIG. 9 is a block diagram of a wireless station 900 or wireless node or network node 900 according to an example embodiment. The wireless node or wireless station or network node 900 may include, e.g., one or more of an AP, BS, gNB, RAN node, relay node, UE or user device, network node, network entity, DU, CU-CP, CU-UP, . . . or other node) according to an example embodiment.

The wireless station 900 may include, for example, one or more (e.g., two as shown in FIG. 9) radio frequency (RF) or wireless transceivers 902A, 902B, where each wireless transceiver includes a transmitter to transmit signals and a receiver to receive signals. The wireless station also includes a processor or control unit/entity (controller) 904 to execute instructions or software and control transmission and receptions of signals, and a memory 906 to store data and/or instructions.

Processor 904 may also make decisions or determinations, generate frames, packets or messages for transmission, decode received frames or messages for further processing, and other tasks or functions described herein. Processor 904, which may be a baseband processor, for example, may generate messages, packets, frames or other signals for transmission via wireless transceiver 902 (902A or 902B). Processor 904 may control transmission of signals or messages over a wireless network, and may control the reception of signals or messages, etc., via a wireless network (e.g., after being down-converted by wireless transceiver 902, for example). Processor 904 may be programmable and capable of executing software or other instructions stored in memory or on other computer media to perform the various tasks and functions described above, such as one or more of the tasks or methods described above. Processor 904 may be (or may include), for example, hardware, programmable logic, a programmable processor that executes software or firmware, and/or any combination of these. Using other terminology, processor 904 and transceiver 902 together may be considered as a wireless transmitter/receiver system, for example.

In addition, referring to FIG. 9, a controller (or processor) 908 may execute software and instructions, and may provide overall control for the station 900, and may provide control for other systems not shown in FIG. 9, such as controlling input/output devices (e.g., display, keypad), and/or may execute software for one or more applications that may be provided on wireless station 900, such as, for example, an email program, audio/video applications, a word processor, a Voice over IP application, or other application or software.

In addition, a storage medium may be provided that includes stored instructions, which when executed by a controller or processor may result in the processor 904, or other controller or processor, performing one or more of the functions or tasks described above.

According to another example embodiment, RF or wireless transceiver(s) 902A/902B may receive signals or data and/or transmit or send signals or data. Processor 904 (and possibly transceivers 902A/902B) may control the RF or wireless transceiver 902A or 902B to receive, send, broadcast or transmit signals or data.

The example embodiments are not, however, restricted to the system that is given as an example, but a person skilled in the art may apply the solution to other communication systems. Another example of a suitable communications system is the 5G system. It is assumed that network architecture in 5G will be quite similar to that of the LTE-advanced. 5G is likely to use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent.

Example embodiments of the various techniques described herein may be implemented in digital electronic circuitry, or in computer hardware, firmware, software, or in combinations of them. Example embodiments may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, example embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Example embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. An apparatus comprising:
at least one processor; and
at least one memory including computer program code;
the at least one memory and the computer program code configured to, with the at least one processor, cause the apparatus at least to:
receive, from a user equipment (UE), a communication including a feature vector;
store a dataset including one or more vectors associated with the UE;
communicate, to a network device, the dataset associated with the UE;
receive, from the network device, a machine learning (ML) model, the ML model being trained, using the dataset, to detect UE orientation; and
communicate, to the UE, the trained ML model,
wherein the apparatus is further caused to:
receive, from the UE, a communication indicating a sensor failure at the UE; and
receive, from the UE, a communication including a request for the trained ML model, wherein the receiving of the trained ML model from the network device is in response to a request for the trained ML model based on the communication of the request for the trained model from the UE.

2. The apparatus of claim 1, wherein the dataset includes UE information associated with orientation.

3. The apparatus of claim 1, wherein the feature vector includes information associated with at least one of Reference Signal Received Power (RSRP) measurements, Signal to Interference and Noise Ratio measurements, serving mobile terminal panel, serving receiver beam, serving transmitter beam(s), or UE orientation.

4. The apparatus of claim 1, wherein the feature vector includes at least one of RSRPs of strongest beams to the BS, selected UE panel, receiver beam, or UE orientation per each reported RSRP.

5. The apparatus of claim 1, wherein the trained ML model maps a set of RSRP, selected UE panel and selected receiver beam, and serving transmitter beam(s) to the UE orientation.

6. The apparatus of claim 1, wherein the communication including the request for the trained ML model received from the UE includes UE device type information and UE sensor type information.

7. The apparatus of claim 1, wherein the request for the trained ML model communicated to the network device includes UE device type information and UE sensor type information.

8. The apparatus of claim 1, wherein the apparatus further caused to:

select the trained ML model; and evaluate an accuracy of the trained ML model based a test dataset, wherein the communicating of the trained ML model is in response to determining the trained ML model meets an accuracy criterion.

9. The apparatus of claim 1, wherein the apparatus further caused to:

receive, from the UE, a communication including UE orientation determined using the trained ML model.

10. An apparatus comprising:

at least one processor; and at least one memory including computer program code;

the at least one memory and the computer program code configured to, with the at least one processor, cause the apparatus at least to:

generate a feature vector based on measurements performed by the apparatus;

communicate, to a base station (BS), a message including the feature vector; and receive, from the BS, a machine learning (ML) model, the ML model being trained, using the feature vector, to detect an orientation of the apparatus, further causing the apparatus to:

determine at least one sensor failure, the sensor being associated with determining orientation of the apparatus;

communicate, to the BS, a message indicating the sensor failure at the apparatus; and communicate, to the BS, a message including a request for the trained ML model.

11. The apparatus of claim 10, wherein the feature vector includes information associated with at least one of Reference Signal Received Power (RSRP) measurements, Signal to Interference and Noise Ratio measurements, serving mobile terminal panel, serving receiver beam, serving transmitter beam(s), or orientation of the apparatus.

12. The apparatus of claim 10, wherein the feature vector includes at least one of RSRPs of strongest beams to the BS, selected panel, receiver beam, or orientation of the apparatus per each reported RSRP.

13. The apparatus of claim 10, wherein the trained ML model maps a set of RSRP, selected panel, selected receiver beam and serving transmitter beam(s) to the orientation of the apparatus.

14. The apparatus of claim 10, wherein the communication including the request for the trained ML model includes device type information of the apparatus and sensor type information of the apparatus.

15. The apparatus of claim 10, further causing the apparatus to communicate, to the BS, a message including orientation of the apparatus determined using the trained ML model.

16. A method comprising generating, by a user equipment (UE), a feature vector based on UE measurements;

communicating, by the UE to a base station (BS), a message including the feature vector; and receiving, by the UE from the BS, a machine learning (ML) model, the ML model being trained, using the feature vector, to detect UE orientation, further comprising:

determining, by the UE, at least one sensor failure, the sensor being associated with determining UE orientation;

communicating, by the UE to the BS, a message indicating the sensor failure at the UE; and communicating, by the UE to the BS, a message including a request for the trained ML model.

17. The method of claim 16, wherein the trained ML model maps a set of RSRP, selected UE panel and selected receiver beam, and serving transmitter beam(s) to the UE orientation.

* * * * *